United States Patent

Shiraishi

[11] Patent Number: 6,081,274
[45] Date of Patent: Jun. 27, 2000

[54] SHADING PROCESSING DEVICE

[75] Inventor: Naoto Shiraishi, Osaka, Japan

[73] Assignee: Ricoh Company, Ltd., Tokyo, Japan

[21] Appl. No.: 08/919,304

[22] Filed: Aug. 28, 1997

[30] Foreign Application Priority Data

Sep. 2, 1996 [JP] Japan ................................. 8-232020

[51] Int. Cl.[7] .............................. G06T 15/60; G06K 9/46
[52] U.S. Cl. ........................ 345/426; 345/431; 345/432; 364/715.03; 382/232
[58] Field of Search ................................... 345/426, 431, 345/432, 133; 382/232; 364/715.04, 715.03; 708/516, 518

[56] References Cited

U.S. PATENT DOCUMENTS

| | | | |
|---|---|---|---|
| 4,646,075 | 2/1987 | Andrews et al. | 345/426 X |
| 4,709,231 | 11/1987 | Sakaibara et al. | 345/426 |
| 4,808,988 | 2/1989 | Burke et al. | 345/133 X |
| 4,866,637 | 9/1989 | Gonzalez-Lopez | 364/518 |
| 4,943,938 | 7/1990 | Aoshima et al. | 399/12 |
| 4,945,500 | 7/1990 | Deering | 345/426 X |
| 5,063,375 | 11/1991 | Lien et al. | 345/133 X |
| 5,253,339 | 10/1993 | Wells et al. | 345/426 |
| 5,307,449 | 4/1994 | Kelley et al. | 345/419 |
| 5,369,737 | 11/1994 | Gholizadeh et al. | 345/426 |
| 5,550,641 | 8/1996 | Shashua et al. | 386/128 X |
| 5,659,671 | 8/1997 | Tannenbaum et al. | 345/426 |
| 5,704,024 | 12/1997 | Voorhies et al. | 345/426 |
| 5,706,415 | 1/1998 | Kelley et al. | 345/426 |
| 5,739,820 | 4/1998 | Lyon | 345/426 |
| 5,745,636 | 4/1998 | Shahua et al. | 386/128 X |
| 5,777,608 | 7/1998 | Lipovski et al. | 345/426 X |
| 5,880,736 | 3/1999 | Peercy et al. | 345/426 |

FOREIGN PATENT DOCUMENTS

| | | |
|---|---|---|
| 61-103277 | 5/1986 | Japan . |
| 62-204386 | 9/1987 | Japan . |

*Primary Examiner*—Mark R. Powell
*Assistant Examiner*—Chante' Harrison
*Attorney, Agent, or Firm*—Oblon, Spivak, McClelland, Maier & Neustadt, P.C.

[57] ABSTRACT

A light-source vector generating device obtains a normalized light-source vector of a point light source from light-source coordinates and polygon vertex coordinates. A diffuse reflection processing device obtains a first inner product of the normalized light-source vector calculated by the light-source vector generating device and a polygon normal vector. A specular reflection processing device obtains a light-source reflection vector from the normalized light-source vector and polygon normal vector, and obtains a second inner product of the light-source reflection vector and a sight-line (eye) vector. A color information generating device calculates polygon surface or polygon vertex color information, which has undergone shading processing, by multiplying the first inner product by diffuse reflection coefficients so as to obtain diffuse reflection light intensities and multiplying the second inner product by specular reflection coefficients so as to obtain specular reflection light intensities. The light-source vector generating device reduces the bit length of each value of the light-source vector before normalizing.

8 Claims, 9 Drawing Sheets

TO RGB GENERATING DEVICE

```
     F E D C B A 9 8 7 6 5 4 3 2 1 0        "0" COUNT VALUE
X    0 0 0 0 0 0 1 1 0 1 0 1 1 1 0             7

AFTER SHIFTING (5-1) BITS

BIT LENGTH IS REDUCED TO 8 BITS

SHADING PROCESSING DEVICE

BACKGROUND OF THE INVENTION

1. Field of the Invention

The present invention relates to an image generation through a computer, and to a shading processing device which performs shading processing on a CRT image and displays the image.

2. Description of the Related Art

In the field of computer graphics, polygons of respective surfaces of a solid are shaded in accordance with a light source position and an ambient condition, and thereby, more realistic solid expression has been tried.

In the related art, as shading and lighting processing in computer graphics, shading processing with a parallel light source has often been used because an operation processing amount therefor is little. Japanese Laid-Open Patent Application Nos. 61-103277 and 62-204386 disclose shading processing methods for performing a shading processing operation at high speed using a parallel light source.

In the related art, real-time computer graphics are often performed by software which is executed by a digital signal processor (DSP) or the like. However, processing for a point light source or a spotlight is a large operation requiring a large time when the processing is performed by the software executed by the DSP or the like.

Especially, in shading processing using a point light source, when obtaining a normalized unit light-source vector for a polygon vertex and the point light source, as shown in the following equations (1) through (6), root operations are needed for normalizing a light-source vector. These root operations require a large operation time.

$$DX = LPX - PX \quad (1)$$

$$LNX = DX / \{(DX)^2 + (DY)^2 + (DZ)^2\}^{1/2} \quad (2)$$

$$DY = LPY - PY \quad (3)$$

$$LNY = DY / \{(DX)^2 + (DY)^2 + (DZ)^2\}^{1/2} \quad (4)$$

$$DZ = LPZ - PZ \quad (5)$$

$$LNZ = DZ / \{(DX)^2 + (DY)^2 + (DZ)^2\}^{1/2} \quad (6)$$

In the equations, DX represents the X value of the light-source vector; PX represents the X address value of the polygon vertex; LPX represents the X address value of the point light source; LNX represents the X value of the normalized light-source vector; DY represents the Y value of the light-source vector; PY represents the Y address value of the polygon vertex; LPY represents the Y address value of the point light source; LNY represents the Y value of the normalized light-source vector; DZ represents the Z value of the light-source vector; PZ represents the Z address value of the polygon vertex; LPZ represents the Z address value of the point light source; and LNZ represents the Z value of the normalized light-source vector.

In a case where the root operation processing shown in the equations (1) through (6) is performed by hardware, basically a large hardware is required.

In ordinary full color computer graphics, 8-bit precision for each of R, G and B is sufficient, and, in shading processing, very high precision is not needed.

SUMMARY OF THE INVENTION

The present invention has been devised in consideration of the above-described problems in the related art. An object of the present invention is to reduce a bit length of a light-source vector without significantly reducing an information amount, enable processing of a normalized light-source vector with a small operation unit, and provide a high-speed shading processing device with a small amount of hardware.

A shading processing device according to the present invention, comprises:

light-source vector generating means for obtaining a normalized light-source vector of a point light source from light-source coordinates and polygon vertex coordinates;

diffuse reflection processing means for obtaining a first inner product of the normalized light-source vector calculated by the light-source vector generating means and a polygon normal vector;

specular reflection processing means for obtaining a light-source reflection vector from the normalized light-source vector and polygon normal vector, and obtaining a second inner product of the light-source reflection vector and a sight-line (eye) vector; and color information generating means for calculating polygon surface or polygon vertex color information, which has undergone shading processing, by multiplying the first inner product by diffuse reflection coefficients so as to obtain diffuse reflection light intensities and multiplying the second inner product by specular reflection coefficients so as to obtain specular reflection light intensities, wherein the light-source vector generating means comprises:

means for obtaining a not-yet-normalized light-source vector from the light-source coordinates and the polygon vertex coordinates;

bit-length reducing means for reducing the bit length of each value of the non-yet-normalized light-source vector; and normalizing means for normalizing the not-yet-normalized light-source vector using each value having the reduced bit length.

It is preferable that the bit-length reducing means comprises:

means for counting the "0" values from the MSB in each value of the not-yet-normalized light-source vector and obtaining the minimum count value;

means for shifting each value to the MSB side by an amount obtained from subtracting 1 from the minimum value; and means for using predetermined more significant bits from the shifted each value so that the bit length of each value of the not-yet-normalized light-source vector is reduced.

As mentioned above, in order to reduce the bit lengths and also perform high-quality point light source processing and spotlight processing, by using the bit-length reducing means, the root operation can be performed using the values of the reduced bit lengths. Accordingly, the size of the root processing device can be reduced. As a result, a high-speed shading processing device using a small amount of hardware can be provided.

Other objects and further features of the present invention will become more apparent from the following detailed description when read in conjunction with the accompanying drawings.

DETAILED DESCRIPTION OF THE PREFERRED EMBODIMENT

An embodiment of the present invention will now be described with reference to figures.

Figure 1:
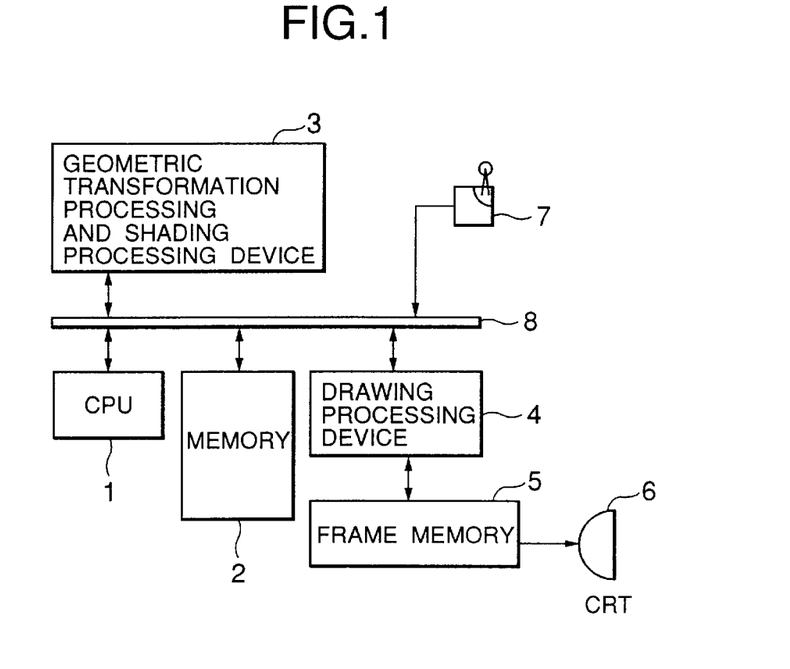
FIG. 1 shows a block diagram of an entire arrangement of an image drawing apparatus provided with a shading processing device according to the present invention.

FIG. 1 shows a block diagram indicating an entire arrangement of an image drawing apparatus provided with a shading processing device according to the present invention.

In the image drawing apparatus, a CPU 1 controls the entirety based on programs stored in a main memory 2. The CPU 1 is connected with respective blocks through a bus 8. A geometric transformation and shading processing device 3 performs geometric transformation processing for obtaining two-dimensional X, Y polygon coordinates projected onto a screen surface, which are needed for real-time computer graphics processing, from view point coordinates, object coordinates, and vertex coordinates of polygons which constitute the object and a direction of line of sight. The geometric transformation and shading processing device 3 also performs a shading processing for obtaining a luminance of polygon surfaces and polygon vertexes from light-source coordinates, the kind of the light source (a point light source, a parallel light source, a spotlight or the like), object coordinates, vertex coordinates of the polygons which constitute the object, normal vectors which the polygon vertexes have, and so forth. Data such as the coordinates which are used in the operations of the geometric transformation and shading processing device 3 is stored in the memory 2. The two-dimensional X, Y coordinates and R, G and B values of the polygon vertexes calculated by the geometric transformation and shading processing device 3 are supplied to a drawing processing device 4. The drawing processing device 4 obtains the image data of the polygons to be drawn on a CRT 6 from the received two-dimensional X, Y coordinates and R, G and B values of the polygon vertexes and so forth, and writes the obtained image data in a frame memory 5. In this embodiment, an operator-machine interface 7, such as an analog stick for inputting an operator's operation into the CPU 1, is provided.

Figure 2:
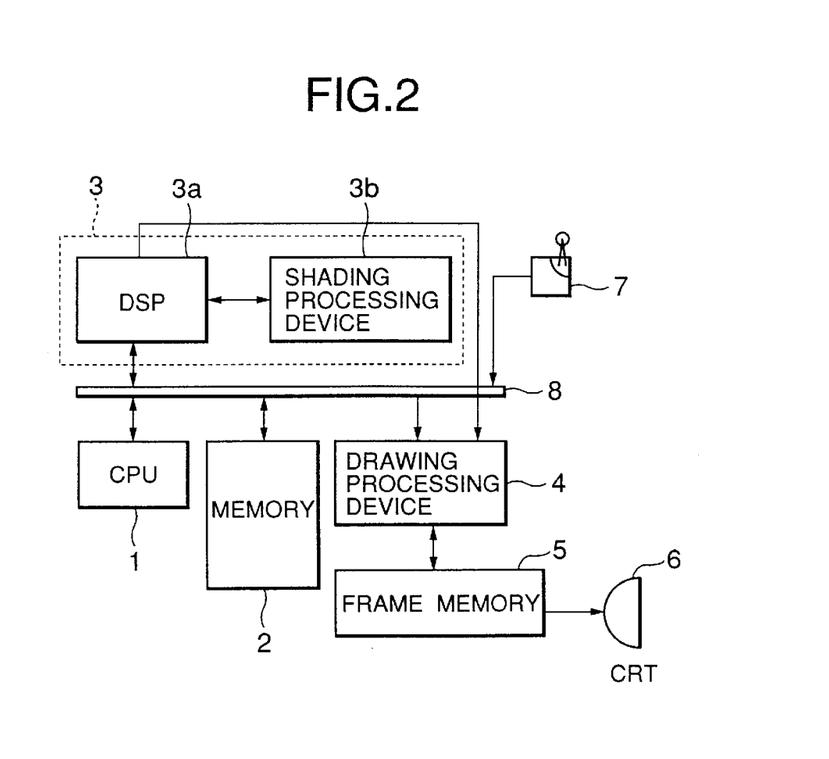
FIG. 2 shows a block diagram of an entire arrangement of an image drawing apparatus provided with a shading processing device according to the present invention, in which a geometric transformation processing and shading processing device includes a DSP and a shading processing device.

In the arrangement shown in FIG. 2, the geometric transformation and shading processing device 3 includes a DSP 3a and a shading processing device 3b, and geometric transformation and shading parameter generation are performed as a set. In the arrangement shown in FIG. 2, because a long processing time is required if light-source vector generation of shading processing is performed by the DSP 3a, a separate device, the shading processing device 3b, is provided. The shading processing device 3b and a light-source vector generating device 30 will be described in detail with reference to FIGS. 3 and 4.

Figure 3:
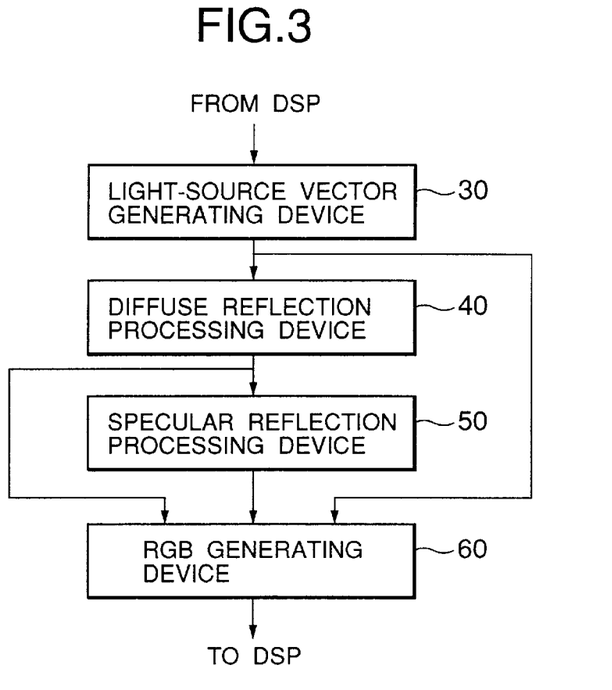
FIG. 3 shows a block diagram of the shading processing device shown in FIG. 2.

FIG. 3 shows a block diagram of the shading processing device 3b.

The light-source coordinates and polygon vertex coordinates are supplied to the light-source vector generating device 30 from the DSP 3a. The light-source generating device 30 obtains a normalized light-source vector of a point light source from the light-source coordinates and polygon vertex coordinates. The obtained light-source vector is supplied to a diffuse reflection processing device 40. The diffuse reflection processing device 40 obtains an inner product of the light-source vector and a polygon normal vector.

Figure 11:
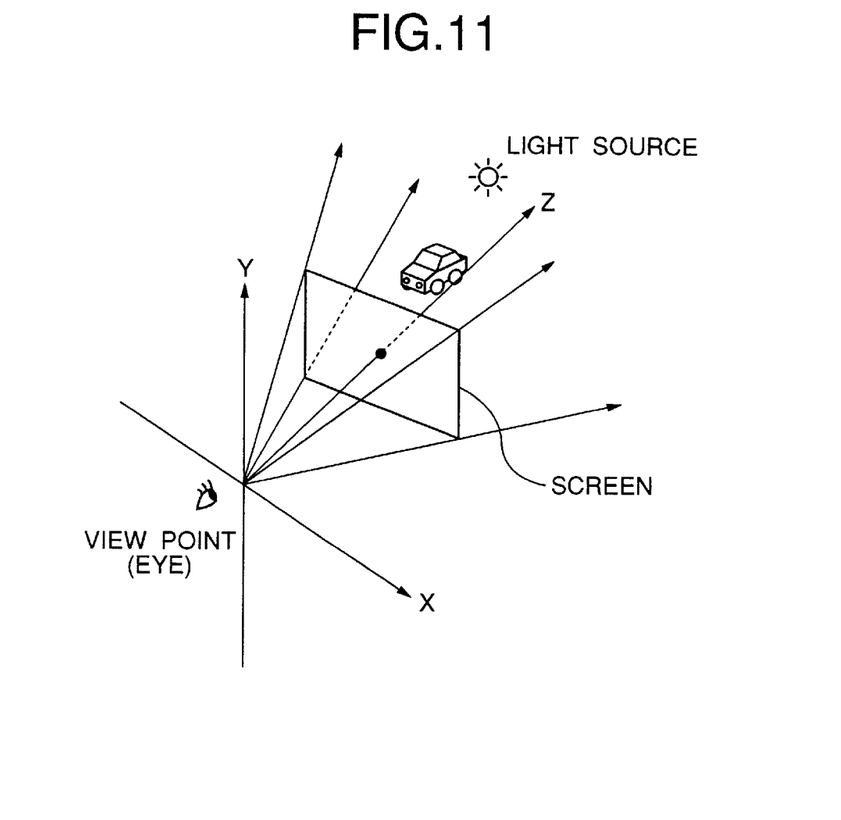
FIG. 11 illustrates view field coordinates to which the present invention is applied.

The inner product value obtained by the diffuse reflection processing device 40 is supplied to a specular reflection processing device 50 and an RGB generating device 60. The specular reflection processing device 50 obtains a light-source reflection vector of a polygon surface or a polygon vertex from the inner product value from the diffuse reflection processing device 40 and the polygon normal vector. The specular reflection processing device 50 then obtains an inner product of the light-source reflection vector and the sight-line (eye) vector as a result of subtraction of the light-source reflection vector and the light-source vector. The specular reflection processing device 50 then gives the obtained inner product to the RGB generating device 60. The above-described operations are performed in a view field (eye) coordinate system shown in FIG. 11. Because the sight-line (eye) vector is fixed so that X, Y, Z=0, 0, 1, the specular reflection device 50 in the embodiment is simplified.

The RGB generating device 60 multiplies the inner product of the light-source vector and polygon normal vector, obtained by the diffuse reflection processing device 40, by the diffuse reflection coefficients of the R, G and B components. Thus, the RGB generating device 60 obtains a diffuse reflection light intensity. The RGB generating device 60 multiplies the inner product of the light-source reflection vector and sight-line (eye) vector, obtained by the specular reflection processing device 50, by the specular reflection coefficients of the R, G and B components. Thus, the RGB generating device 60 obtains a specular reflection light intensity. When the attribute of the light source is a spotlight, with reference to FIG. 12, an inner product of a spotlight vector of the spotlight and the light-source vector is obtained. This inner product is multiplied by a light intensity of the spotlight. Thus, a light-source vector intensity is obtained. The R, G, B diffuse reflection light intensities and specular reflection light intensities are added to one another. The result of the addition is multiplied by the light-source vector intensity. Then, the R, G, B ambient light intensities is added to this multiplication result. Thus, the R, G, B colors of the polygon surface or the polygon vertex are obtained.

Figure 4:
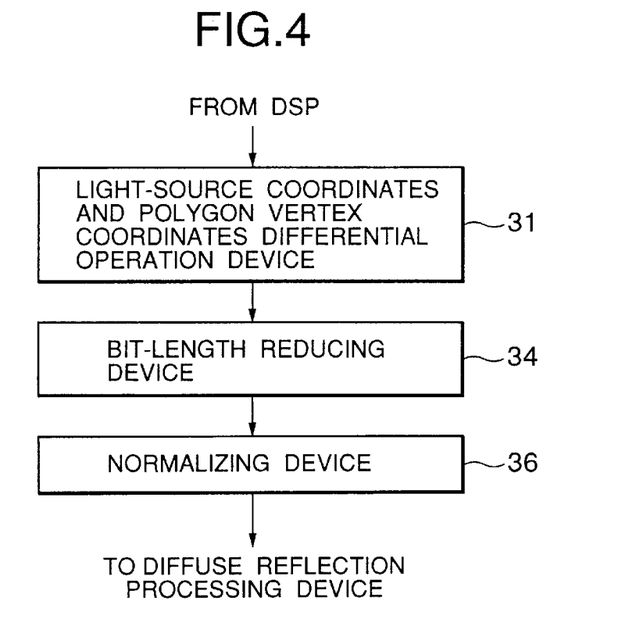
FIG. 4 shows a block diagram of a light-source vector generating device shown in FIG. 3.

FIG. 4 shows a block diagram of the light-source vector generating device 30.

Figure 12:
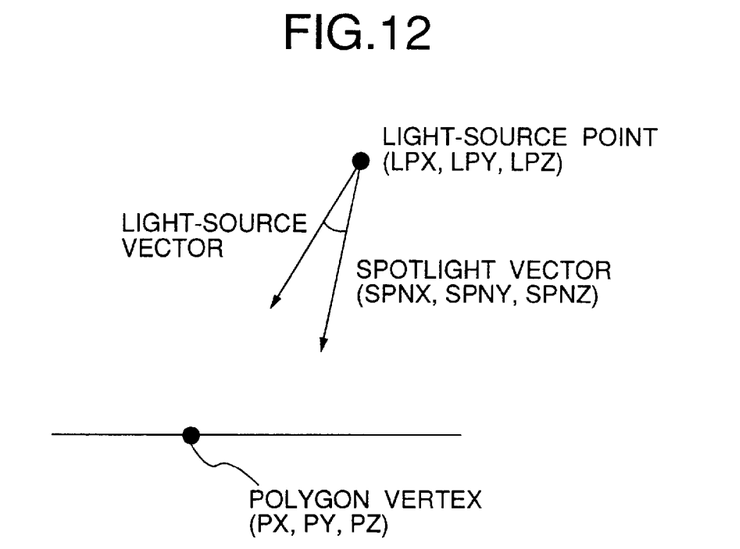
FIG. 12 shows a relationship between a light-source point, a spotlight and a polygon vertex.

A light-source coordinates and polygon vertex coordinates differential operation device 31 obtains the differential value between the coordinate values of the light-source coordinates (LPX, LPY, LPZ) and the coordinate values of the polygon vertex coordinates (PX, PY, PZ), supplied by the DSP 3a, shown in FIG. 12. Thus, as shown in the above-mentioned equations (1), (3) and (5), a light-source vector (DX, DY, DZ) which has not been normalized is obtained. This light-source vector (DX, DY, DZ) is supplied to a bit-length reducing device 34.

Figure 13A:
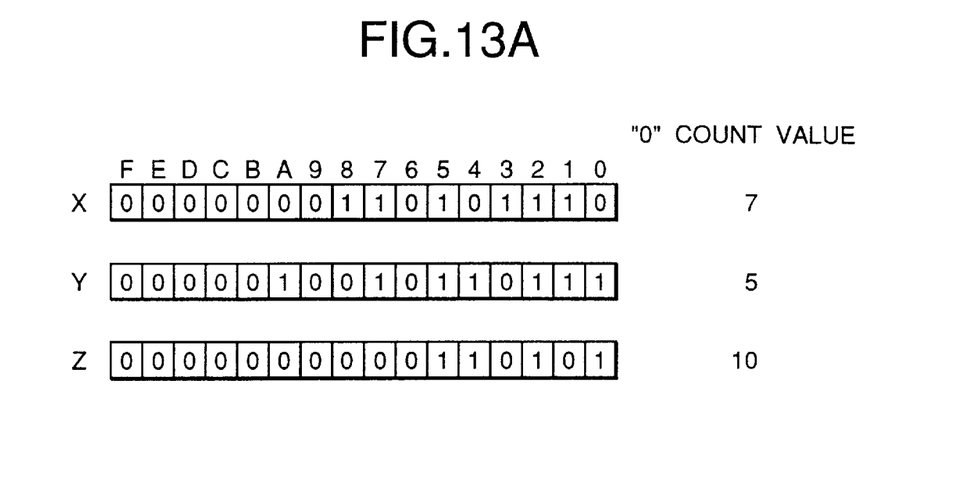
FIGS. 13A, 13B and 13C illustrate the operations of the bit-length reducing device of the present invention.
Figure 13B:
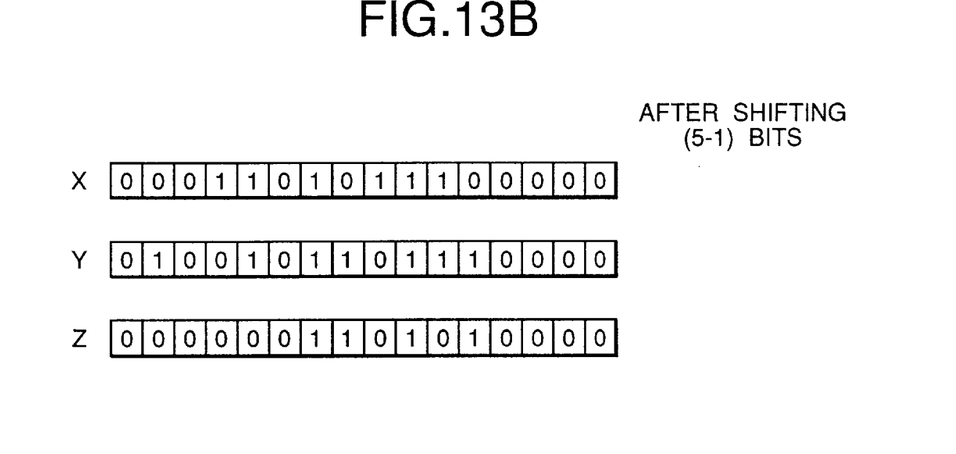
Figure 13C:
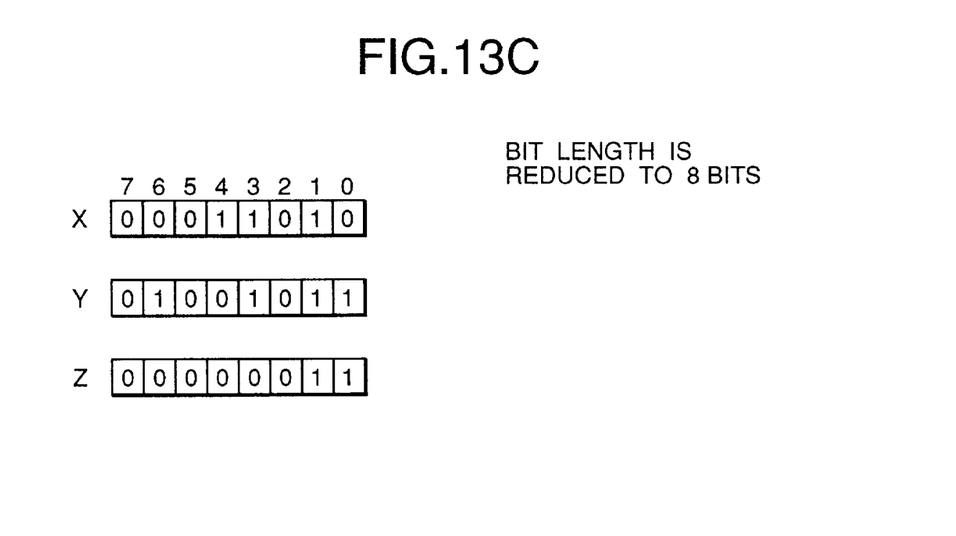

FIG. 13A shows the X, Y and Z component values of the light-source vector which has not been normalized. For each of the X, Y and Z component values, the number of "0"s is counted from the MSB until "1" appears, and the minimum count value is obtained. In this example, as shown in FIG. 13A, the counted number of "0"s is 7 for the X component value, the counted number of "0"s is 5 for the Y component value, and the counted number of "0"s is 10 for the Z component value. In this case, the minimum count value is 5. The bits of each of the X, Y and Z component values are shifted by an amount obtained from subtracting 1 from the minimum count value. In this case, the bits are shifted by (5–1) bits. FIG. 13B shows the result of the shifting. Then, for each component, only the more significant 8 bits are used. Thus, the remaining bits to be used are shown in FIG. 13C. Thus, the original 16 bits of each bit length of the light-source vector is reduced to 8 bits. Thereby, it is possible to reduce each bit length of the light-source vector without significantly reducing the information amount.

This reduced light-source vector is used, and, by a normalizing device 36, in accordance with the above-mentioned equations (2), (4) and (6), the light-source vector is normalized. That is, the reduced bit-length X, Y, Z light-source vector values are squared, respectively, the squared results are added together, the addition result undergoes the square root operation, and division is performed on the original X, Y, Z light-source vector values by the obtained root. Thus, the normalized light-source vector (LNX, LNY, LNZ) is calculated.

Specific examples of the devices of the light-source vector generating device 30 will now be described with reference to FIGS. 5 through 7.

Figure 5:
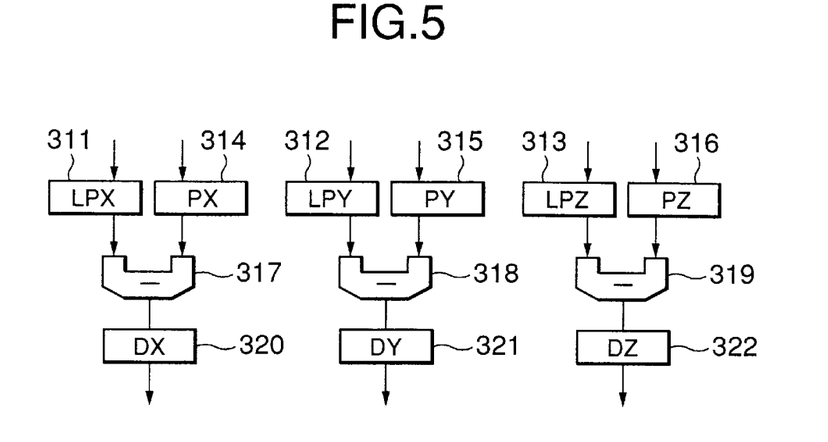
FIG. 5 shows a circuit diagram indicating a specific circuit of a light-source coordinates and polygon vertex coordinates differential operation device of the light-source vector generating device.

FIG. 5 shows a circuit diagram indicating a specific circuit of the light-source coordinates and polygon vertex coordinates differential operation device 31. The light-source point coordinates (LPX, LPY, LPZ) are supplied from the DSP 3a, and the X address value (LPX), Y address value (LPY) and Z address value (LPZ) of the light-source point coordinates are stored in registers 311, 312 and 313, respectively. Further, the polygon vertex coordinates (PX, PY, PZ) are supplied from the DSP 3a, and the X address value (PX), Y address value (PY) and Z address value (PZ) of the polygon vertex coordinates are stored in registers 314, 315 and 316, respectively.

The X address value (LPX) of the light-source point coordinates stored in the register 311 and the X address value (PX) of the polygon vertex coordinates stored in the register 314 are supplied to a subtracter 317. The subtracter 317 performs the calculation of the differential value between the light-source coordinates and polygon vertex coordinates, that is, performs the operation of LPX–PX. The operation result, that is, the light-source vector value in the X direction (DX) which has not been normalized, is stored in a resistor 320. Further, the Y address value (LPY) of the light-source point coordinates stored in the register 312 and the Y address value (PY) of the polygon vertex coordinates stored in the register 315 are supplied to a subtracter 318. The subtracter 318 performs the calculation of the differential value between the light-source coordinates and polygon vertex coordinates, that is, performs the operation of LPY–PY. The operation result, that is, the light-source vector value in the Y direction (DY) which has not been normalized, is stored in a resistor 321. Furthermore, the Z address value (LPZ) of the light-source point coordinates stored in the register 313 and the Z address value (PZ) of the polygon vertex coordinates stored in the register 316 are supplied to a subtracter 319. The subtracter 319 performs the calculation of the differential value between the light-source coordinates and polygon vertex coordinates, that is, performs the operation of LPZ–PZ. The operation result, that is, the light-source vector value in the Z direction (DZ) which has not been normalized is, stored in a resistor 322. The light-source vector values (DX, DY, DZ), which have not been normalized, stored in the registers 320, 321 and 322, respectively, are supplied to the bit-length reducing device 34.

Figure 6:
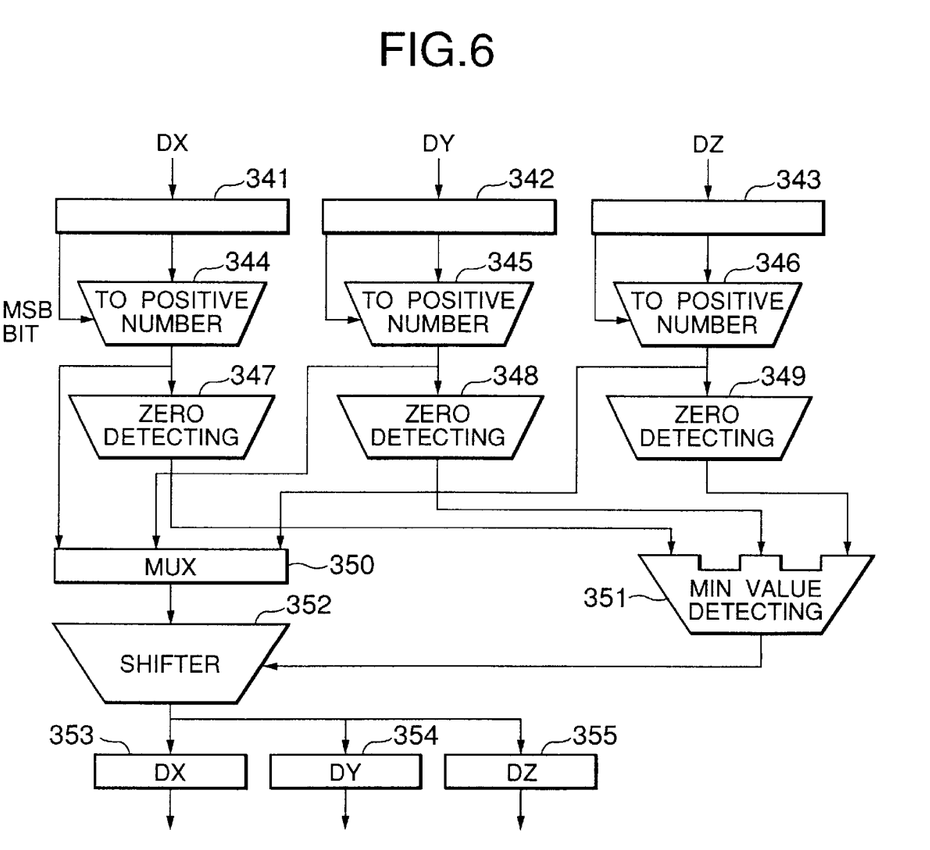
FIG. 6 shows a circuit diagram indicating a specific circuit of a bit-length reducing device of the light-source vector generating device.

FIG. 6 shows a circuit diagram of a specific circuit of the bit-length reducing device 34. The light-source vector values (DX, DY, DZ), which have not been normalized, supplied from the light-source coordinates and polygon vertex coordinates differential operation device 31, are supplied to registers 341, 342 and 343, respectively. The X-directional light-source vector value (DX) stored in the register 341 is supplied to a converting-into-positive-number circuit 344. When the light-source vector value (DX) stored in the register 341 is negative, the converting-into-positive-number circuit 344 converts the negative value into the positive value, and gives the resulting value to a zero ("0") detecting circuit 347 and a multiplexer 350. As described above with reference to FIG. 13A, the zero detecting circuit 347 counts the "0" values from the MSB until the value "1" appears, and gives the count value to a minimum (MIN) value detecting circuit 351.

Further, the Y-directional light-source vector value (DY) stored in the register 342 is supplied to a converting-into-positive-number circuit 345. When the light-source vector value (DY) stored in the register 342 is negative, the converting-into-positive-number circuit 345 converts the negative value into the positive value, and gives the resulting value to a zero ("0") detecting circuit 348 and the multiplexer 350. Similar to the zero detecting circuit 347, the zero detecting circuit 348 counts the "0" value from the MSB until the value "1" appears, and gives the count value to the minimum (MIN) value detecting circuit 351.

Furthermore, the Z-directional light-source vector value (DZ) stored in the register 343 is supplied to a converting-into-positive-number circuit 346. When the light-source vector value (DZ) stored in the register 343 is negative, the converting-into-positive-number circuit 346 converts the negative value into the positive value, and gives the resulting value to a zero ("0") detecting circuit 349 and the multiplexer 350. Similar to the zero detecting circuit 347, the zero detecting circuit 349 counts the "0" value from the MSB until the value "1" appears, and gives the count value to the minimum (MIN) value detecting circuit 351.

The MIN value detecting circuit 351 obtains the minimum value from among the values output from the zero detecting circuits 347, 348 and 349, and gives the minimum value to a shifter 352. As described above with reference to FIG. 13B, the shifter 352 shifts the bits of each of the light-source vector values (DX, DY, DZ) by the amount obtained from subtracting 1 from the minimum value supplied from the MIN value detecting circuit 351. The resulting values are supplied to registers 353, 354 and 355. Each of the registers 353, 354 and 355 is an 8-bit register in this embodiment. As described above with reference to FIG. 13C, the respective register receives only the more significant 8 bits of each bit-shifted light-source vector value supplied from the multiplexer 350. As a result, the reduced bit-length light-source vector values (DX, DY, DZ) are stored in the register 353, 354 and 355, respectively. Thus, in the bit-length reducing device 34, the bit length of 16 bits of each one of the light-source vector values is reduced to 8 bits. The reduced bit-length light-source vector values (DX, DY, DZ) are supplied to the normalizing device 36.

Figure 7:
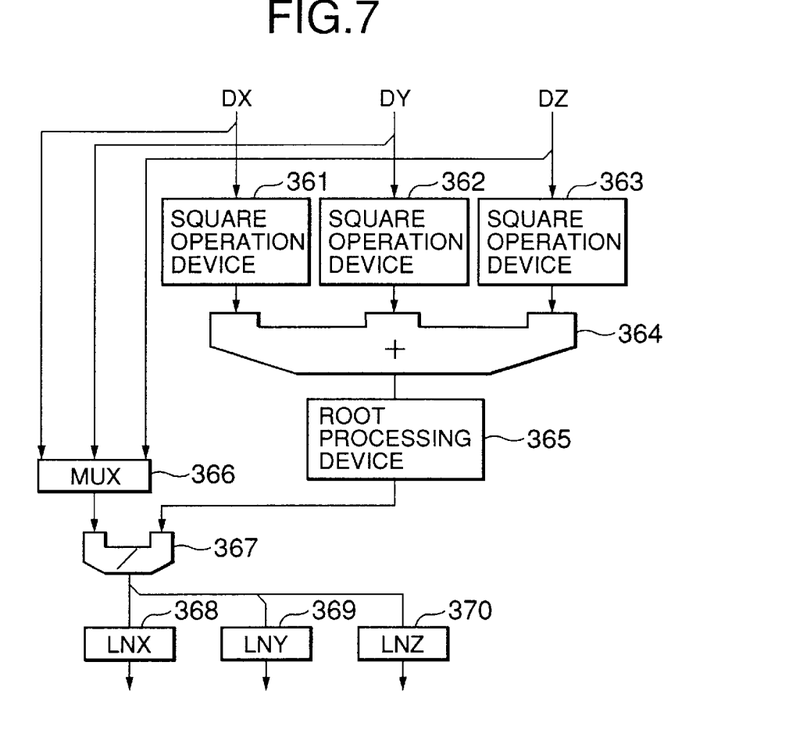
FIG. 7 shows a circuit diagram indicating a specific circuit of a normalizing device of the light-source vector generating device.

FIG. 7 shows a circuit diagram of a specific circuit of the normalizing device 36. The light-source vector values (DX, DY, DZ), the bit lengths of which are reduced in the bit-length reducing device 34, are supplied to square operation devices 361, 362 and 363, respectively, and to a multiplexer 366. The square operation device 361 squares the reduced bit-length light-source vector value (DX) and supplies the resulting value to an adding operation device 364. The square operation device 362 squares the reduced bit-length light-source vector value (DY) and supplies the resulting value to the adding operation device 364. The square operation device 363 squares the reduced bit-length light-source vector value (DZ) and supplies the resulting value to the adding operation device 364. The adding operation device 364 performs the adding operation: $(DX)^2+(DY)^2+(DZ)^2$, and the result is supplied to a root processing device 365. The root processing device 365 obtains the square root of $\{(DX)^2+(DY)^2+(DZ)^2\}$, and gives the root to one input of a divider 367. DX, DY and DZ are supplied to the other input of the divider 367 through the multiplexer 366. The divider 367 performs the operations: $LNX=DX/\{(DX)^2+(DY)^2+(DZ)^2\}^{1/2}$, $LNY=DY/\{(DX)^2+(DY)^2+(DZ)^2\}^{1/2}$, and $LNZ=DZ/\{(DX)^2+(DY)^2+(DZ)^2\}^{1/2}$. The thus-normalized light-source vector values (LNX, LNY, LNZ) are stored in registers 368, 369 and 370, respectively, and the stored light-source vector values (LNX, LNY, LNZ) are supplied to the diffuse reflection processing device 40.

Because the bit-length reducing device 34 reduces the bit length of 16 bits of each of the light-source vector values to 8 bits, the normalizing device 36 can be formed of an operation unit of an 18-bit length. In contrast to this, if the bit length of 16 bits of each of the light-source vector values is not reduced, the operation of a 35-bit length is needed and the operation circuit is of a large scale.

Figure 8:
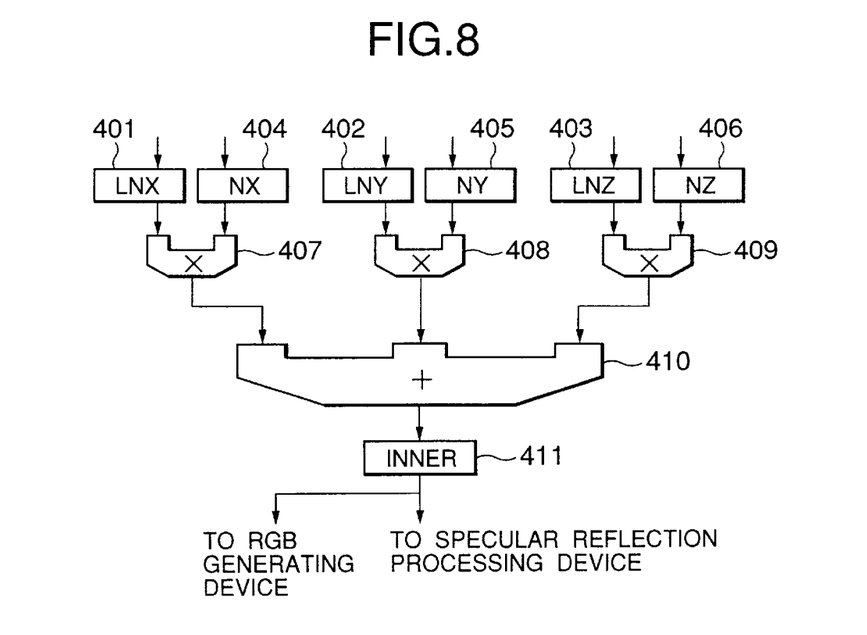
FIG. 8 shows a circuit diagram of a specific circuit of a diffuse reflection processing device of the shading processing device according to the present invention.

FIG. 8 shows a circuit diagram of a specific circuit of the diffuse reflection processing device 40. The normalized light-source vector values (LNX, LNY, LNZ) supplied from the normalizing device 36 are stored in registers 401, 402 and 403, respectively. Further, the polygon vertex normal vector values (NX, NY, NZ) are stored in registers 404, 405 and 406, respectively. The X value of the light-source vector (LNX) stored in the register 401 and the X value of the normal vector (NX) stored in the register 404 are supplied to a multiplier 407, and the value obtained from the multiplication performed by the multiplier 407 is supplied to an adder 410. The Y value of the light-source vector (LNY) stored in the register 402 and the Y value of the normal vector (NY) stored in the register 405 are supplied to a multiplier 408, and the value obtained from the multiplication performed by the multiplier 408 is supplied to the adder 410. The Z value of the light-source vector (LNZ) stored in the register 403 and the Z value of the normal vector (NZ) stored in the register 406 are supplied to a multiplier 409, and the value obtained from the multiplication performed by the multiplier 409 is supplied to the adder 410. By the multipliers 407, 408, 409 and adder 410, the inner product of the light-source vector and the polygon vertex normal vector is obtained. This inner product value is stored in a register 411 and is supplied to the RGB generating device 60 and the specular reflection processing device 50.

Figure 9:
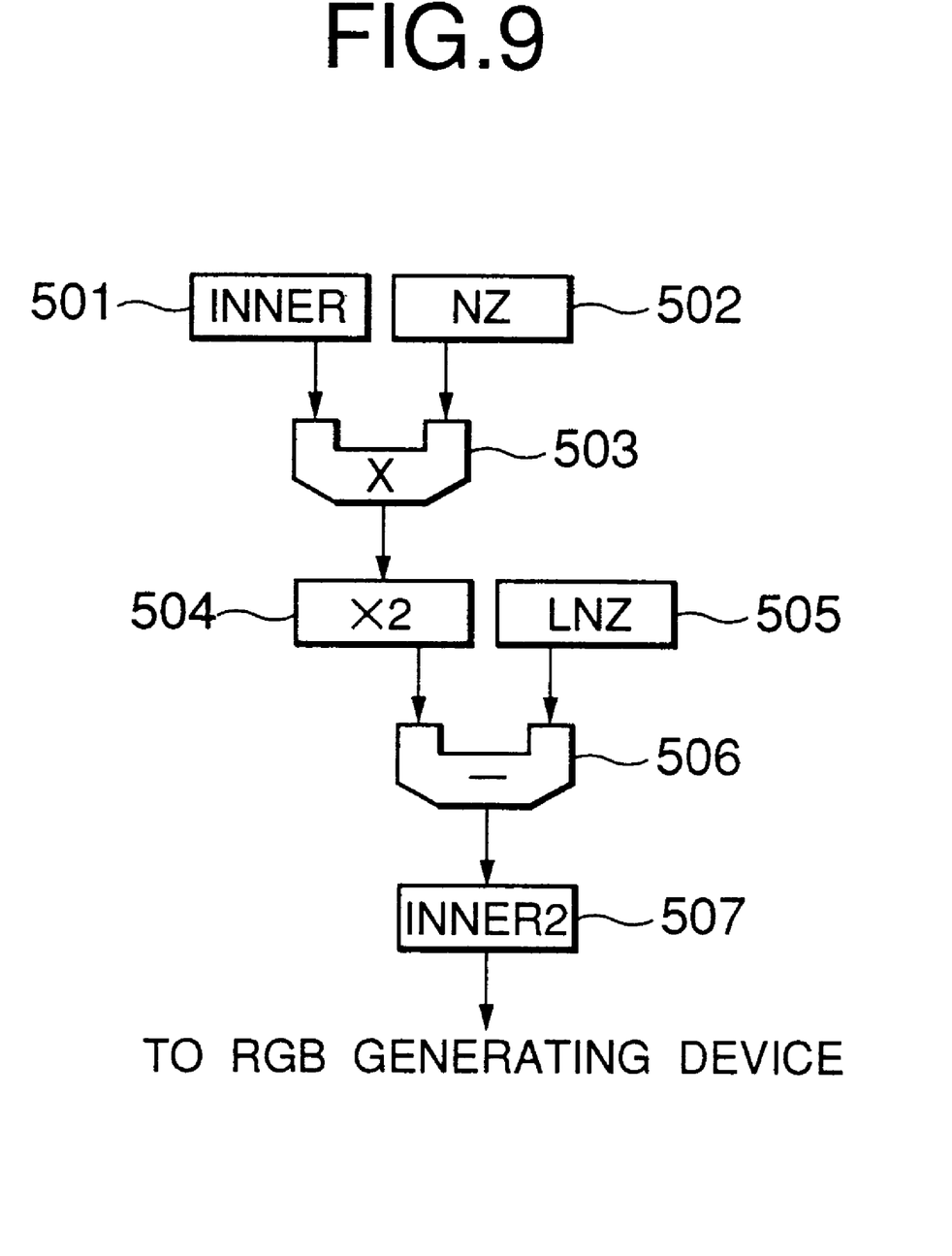
FIG. 9 shows a circuit diagram of a specific circuit of a specular reflection processing device of the shading processing device according to the present invention.

FIG. 9 shows a circuit diagram of a specific circuit of the specular reflection processing device 50. The inner product value of the light-source vector and the polygon vertex normal vector (INNER), supplied from the diffuse reflection processing device 40, is stored in a register 501, and the Z value of the polygon vertex normal vector (NZ) is stored in a register 502. The inner product value (INNER) stored in the register 501 and the Z value of the normal vector (NZ) stored in the register 502 are supplied to a multiplier 503. The multiplier 503 multiplies the inner product value (INNER) by the Z value of the normal vector (NZ), and the result is supplied to an operation unit 504. The operation unit 504 is a ×2 operation unit, and calculates the Z value of the light-source reflection vector at the polygon vertex. The calculated Z value is supplied to one input of a subtracter 506. The Z value of the light-source vector (LNZ) stored in a register 505 is supplied to the other input to the subtracter 506. As a result of the subtracter 506 performing the subtraction, the inner product of the light-source reflection vector and the sight-line (eye) vector (INNER2) is obtained. This value is stored in a register 507 and is supplied to the RGB generating device 60.

As mentioned above, the sight-line (eye) vector is fixed so that X, Y, Z=0, 0, 1. Accordingly, the inner product of the light-source reflection vector and the sight-line (eye) vector (INNER2) is the Z value of the light-source reflection vector (RVZ). It is known that the light-source reflection vector $\vec{(RV)}$ is obtained as a result of multiplying the above-mentioned inner product value INNER of the normal vector $\vec{(NV)}$ and the light-source vector $\vec{(LV)}$ by 2, further multiplying by the normal vector $\vec{(NV)}$ and subtracting the light-source vector $\vec{(LV)}$. That is, $\vec{RV}=2\times INNER\times \vec{NV}-\vec{LV}$, and $RVZ=2\times INNER\times NZ-LNZ$.

The circuit shown in FIG. 9 performs this calculation.

Figure 10:
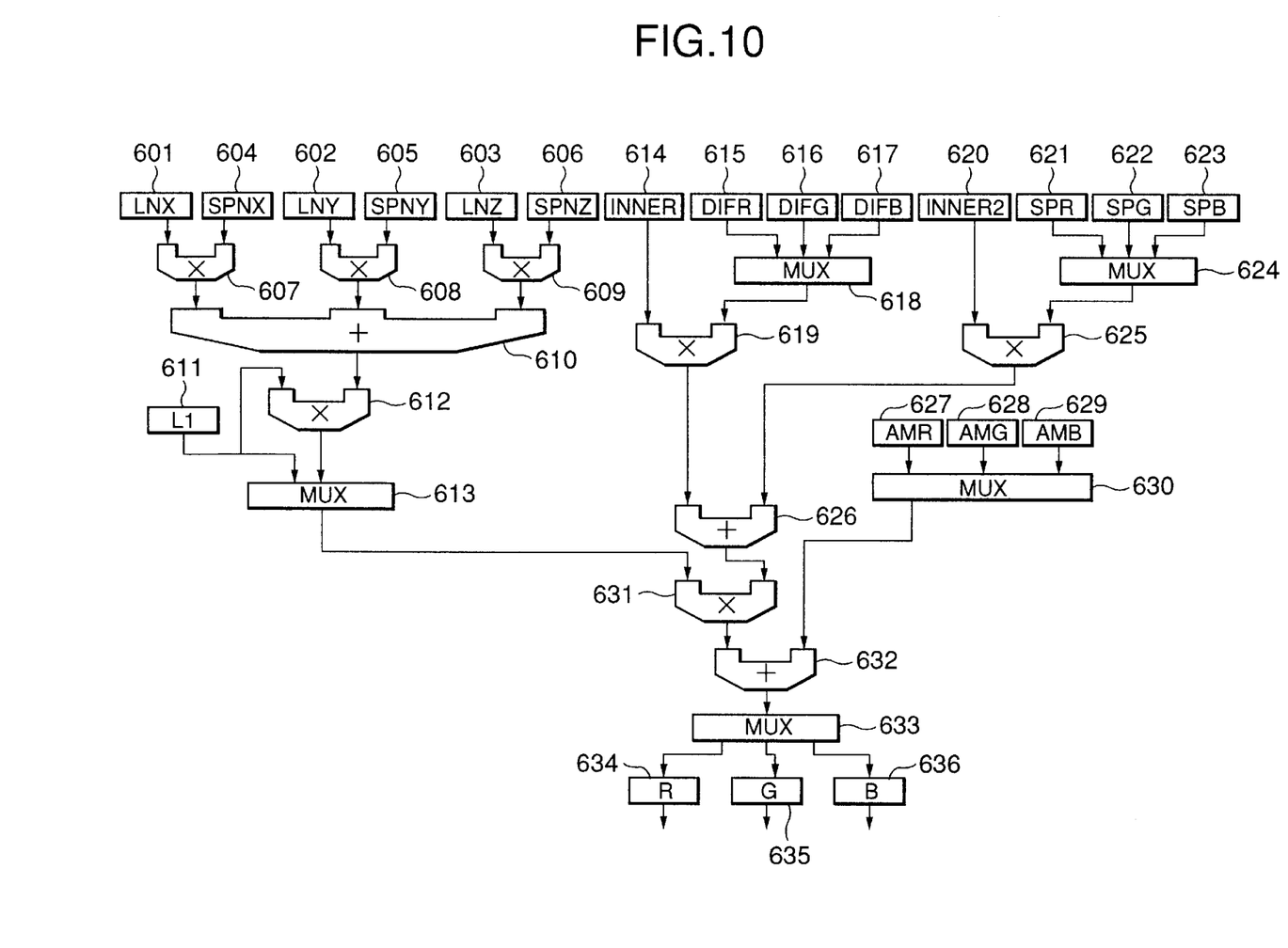
FIG. 10 shows a circuit diagram of a specific circuit of an RGB generating device of the shading processing device according to the present invention.

FIG. 10 shows a circuit diagram of a specific circuit of the RGB generating device 60. The normalized light-source vector values (LNZ, LNY, LNZ) from the light-source vector generating device 30 are stored in registers 601, 602 and 603, respectively. The spotlight vector values (SPNX, SPNY, SPYZ) are stored in registers 604, 605 and 606, respectively. The X value of the light-source vector (LNX) stored in the register 601 and the X value of the spotlight vector (SPNX) stored in the register 604 are supplied to a multiplier 607, and the multiplication result of these two values is supplied to an adder 610. The Y value of the light-source vector (LNY) stored in the register 602 and the Y value of the spotlight vector (SPNY) stored in the register 605 are supplied to a multiplier 608, and the multiplication result of these two values is supplied to the adder 610. The Z value of the light-source vector (LNZ) stored in the register 603 and the Z value of the spotlight vector (SPNZ) stored in the register 606 are supplied to a multiplier 609, and the multiplication result of these two values is supplied to the adder 610. Through the multipliers 607, 608, 609 and adder 610, the inner product value of the light-source vector and the spotlight vector is calculated, and the inner product value is supplied to one input of a multiplier 612. A light intensity of the spotlight stored in a register 611 is supplied to the other input of the multiplier 612. The light intensity stored in the register 611 is also supplied to a multiplexer 613.

With reference to FIG. 12, the light-source vector intensity is obtained from multiplication of the light intensity of the spotlight and the inner product of the spotlight vector and the light-source vector, and the value of the light-source vector intensity is supplied to the multiplexer 613. When the attribute of the light is the spotlight, the multiplexer 613 selects the output from the multiplier 612. When the attribute of the light is not the spotlight, the multiplexer 613 selects the output from the register 611. The selected value is supplied to one input of a multiplier 631.

The inner product of the polygon vertex normal vector and the light-source vector (INNER) from the diffuse reflection processing device 40 is stored in a register 614, and the R, G, B diffuse reflection coefficients (DIFR, DIRG, DIRB) are stored in registers 615, 616 and 617, respectively. The inner product (INNER) stored in the register 614 is supplied to one input of a multiplier 619. The R, G, B diffuse reflection coefficients (DIFR, DIFG, DIFB) stored in the registers 615, 616 and 617, respectively, are supplied to a multiplexer 618. The multiplexer 618 alternately selects the R, G, B diffuse reflection coefficients (DIFR, DIFG, DIFB) and the selected one is supplied to the other input of the multiplier 619. The multiplier 619 calculates the R, G, B diffuse reflection values and supplies the calculated results to one input of an adder 626.

The inner product of the light-source reflection vector and the sight-line (eye) vector (INNER2) from the specular reflection processing device 50 is stored in a register 620, and the R, G, B specular reflection coefficients (SPR, SPG, SPB) are stored in registers 621, 622 and 623, respectively. The inner product (INNER2) stored in the register 620 is supplied to one input of a multiplier 625. The R, G, B specular reflection coefficients (SPR, SPG, SPB) stored in the registers 621, 622 and 623, respectively, are supplied to a multiplexer 624. The multiplexer 624 alternatly selects the R, G, B specular reflection coefficients (SPR, SPG, SPB) and the selected one is supplied to the other input of the multiplier 625. The multiplier 625 calculates the R, G, B specular reflection values and supplies the calculated results to the other input of the adder 626. The adder 626 adds the diffuse reflection values and the specular reflection values together, respectively, and the resulting values are supplied to the other input of the multiplier 631. The multiplier 631 multiplies the sums of the diffuse reflection values and specular reflection values by the light intensity, respectively, and the resulting values are supplied to one input of an adder 632.

The R, G, B ambient light intensities (AMR, AMG, AMB) are stored in registers 627, 628 and 689. A multiplexer 630 alternately selects the ambient light intensities (AMR, AMG, AMB) stored in the registers 627, 628 and 629 and the selected one is supplied to the other input of the adder 632.

The adder 632 adds the values resulting from multiplying the sums of the diffuse reflection values and the specular reflection values by the light intensity, respectively, and the R, G, B ambient light intensities (AMR, AMG, AMB) alternately selected by the multiplexer 630. The resulting values are supplied to a multiplexer 633. The multiplexer 633 alternately selects the R, G, B values, which have thus undergone the shading processing, supplies the R value to a register 634, supplies the G value to a register 635 and supplies the B value to a register 636. Thus, the R, G, B values are generated, and are supplied to the drawing processing device 4.

Such RGB shading processing has been performed through software or the like. However, according to the present invention, by using the bit-length reducing device of the light-source vector generating device, it is possible to perform high-speed point light source processing and spotlight processing with a small amount of hardware.

In the above-described embodiment, the RGB values, which have undergone the shading processing, are calculated. However, it is also possible to perform, instead of calculating the RGB values, which have undergone the shading processing, calculation of a luminance value, which has undergone the shading processing.

Figure 14:
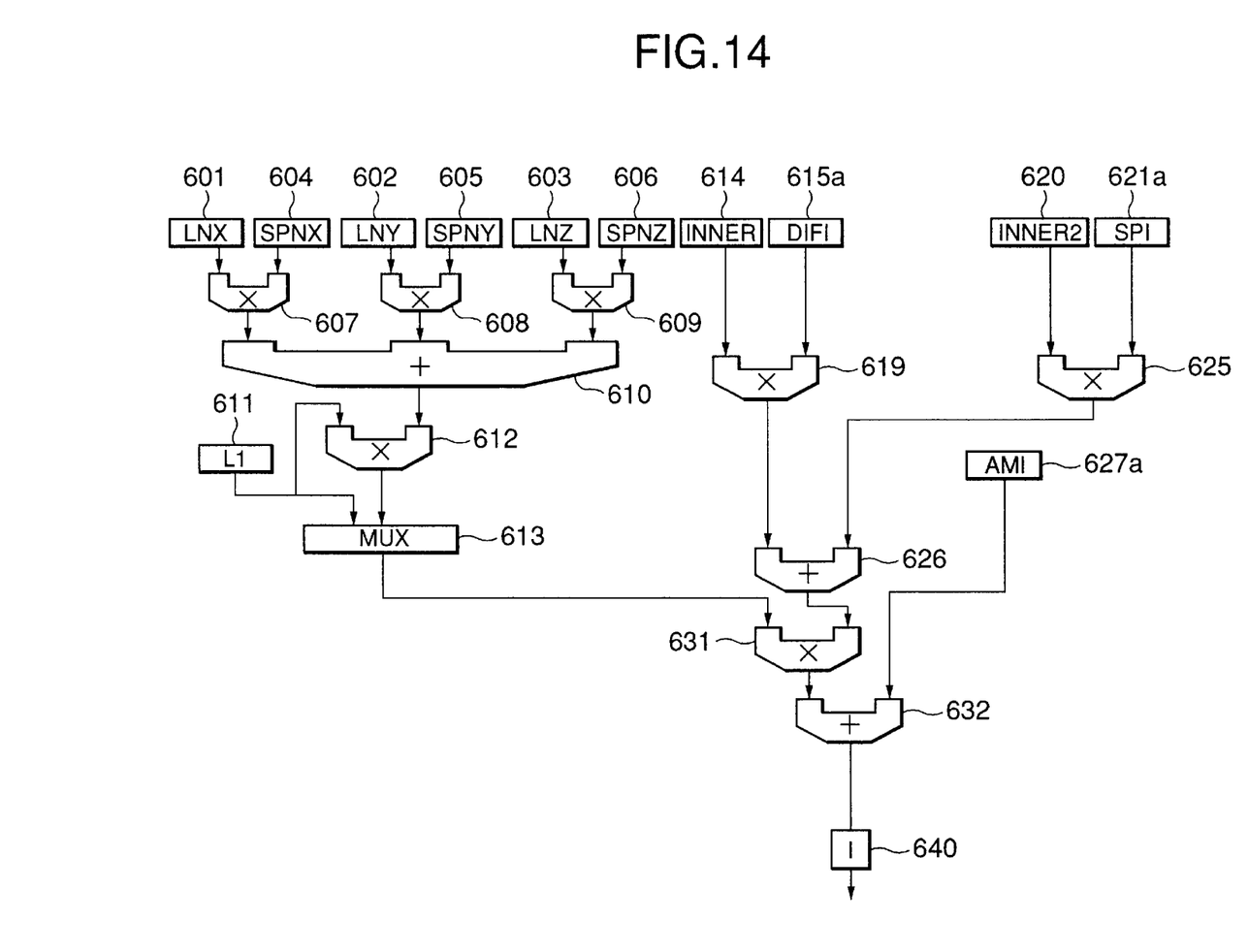
FIG. 14 shows a circuit diagram of a specific circuit of a luminance value generating device of the shading processing device according to the present invention.

In this case, instead of the RGB generating device, a luminance value generating device performs the shading processing. FIG. 14 shows a specific circuit of the luminance value generating device which will now be described. The normalized light-source vector values (LNZ, LNY, LNZ) from the light-source vector generating device 30 are stored in registers 601, 602 and 603, respectively. The spotlight vector values (SPNX, SPNY, SPYZ) are stored in registers 604, 605 and 606, respectively. The X value of the light-source vector (LNX) stored in the register 601 and the X value of the spotlight vector (SPNX) stored in the register 604 are supplied to a multiplier 607, and the multiplication result of these two values is supplied to an adder 610. The Y value of the light-source vector (LNY) stored in the register 602 and the Y value of the spotlight vector (SPNY) stored in the register 605 are supplied to a multiplier 608, and the multiplication result of these two values is supplied to the adder 610. The Z value of the light-source vector (LNZ) stored in the register 603 and the Z value of the spotlight vector (SPNZ) stored in the register 606 are supplied to a multiplier 609, and the multiplication result of these two values is supplied to the adder 610. Through the multipliers 607, 608, 609 and adder 610, the inner product value of the light-source vector and the spotlight vector is calculated, and the inner product value is supplied to one input of a multiplier 612. A light intensity of the spotlight stored in a register 611 is supplied to the other input of the multiplier 612. The light intensity stored in the register 611 is also supplied to a multiplexer 613.

With reference to FIG. 12, the light-source vector intensity is obtained from multiplication of the light intensity of the spotlight and the inner product of the spotlight vector and the light-source vector, and the value of the light-source vector intensity is supplied to the multiplexer 613. When the attribute of the light is the spotlight, the multiplexer 613 selects the output from the multiplier 612. When the attribute of the light is not the spotlight, the multiplexer 613 selects the output from the register 611. The selected value is supplied to one input of a multiplier 631.

The inner product of the polygon vertex normal vector and the light-source vector (INNER) from the diffuse reflection processing device 40 is stored in a register 614, and the diffuse reflection coefficient (DIFI) of the luminance value I is stored in a register 615*a*. The inner product (INNER) stored in the register 614 is supplied to one input of a multiplier 619. The diffuse reflection coefficient (DIFI) of the luminance value I stored in the register 615*a* is supplied to the other input of the multiplier 619. The multiplier 619 calculates the diffuse reflection value of the luminance value and supplies the calculated result to one input of an adder 626.

The inner product of the light-source reflection vector and the sight-line (eye) vector (INNER2) from the specular reflection processing device 50 is stored in a register 620, and the specular reflection coefficient (SPI) of the luminance value I is stored in register 621*a*. The inner product (INNER2) stored in the register 620 is supplied to one input of a multiplier 625. The specular reflection coefficient (SPI) of the luminance I stored in the register 621*a* is supplied to the other input of the multiplier 625. The multiplier 625 calculates the specular reflection value of the luminance value I and supplies the calculated result to the other input of the adder 626. The adder 626 adds the diffuse reflection value and the specular reflection value together and the resulting value is supplied to the other input of the multiplier 631. The multiplier 631 multiplies the sums of the diffuse reflection value and specular reflection value by the light intensity and the resulting value is supplied to one input of an adder 632.

The ambient light intensity (AMI) of the luminance value I is stored in a register 627*a*. The ambient light intensity stored in the register 627*a* is supplied to the other input of the adder 632.

The adder 632 adds the value resulting from multiplying the sum of the diffuse reflection value and the specular reflection value by the light intensity and the ambient light intensity (AMI) of the luminance I. The resulting value is supplied to a register 640 and this value is supplied to the drawing processing device 4.

Such shading processing of the luminance value has been performed through software or the like. However, according to the present invention, by using the bit-length reducing device of the light-source vector generating device, it is possible to perform high-speed point light source processing and spotlight processing with a small amount of hardware.

The present invention is not limited to the above-described examples and embodiments, and variations and modifications may be made without departing from the claimed scope of the present invention.

What is claimed is:

1. A shading processing device, comprising:
    light-source vector generating means for obtaining a normalized light-source vector of a point light source from light-source coordinates and polygon vertex coordinates;
    diffuse reflection processing means for obtaining a first inner product of the normalized light-source vector calculated by the light-source vector generating means and a polygon normal vector;
    specular reflection processing means for obtaining a light-source reflection vector from the normalized light-source vector and polygon normal vector, and obtaining a second inner product of the light-source reflection vector and a sight-line (eye) vector; and
    color information generating means for calculating polygon surface or polygon vertex color information, which has undergone shading processing, by multiplying said first inner product by diffuse reflection coefficients so as to obtain diffuse reflection light intensities and multiplying said second inner product by specular reflection coefficients so as to obtain specular reflection light intensities,
    wherein said light-source vector generating means comprises:
        means for obtaining a not-yet-normalized light-source vector from the light-source coordinates and the polygon vertex coordinates;
        bit-length reducing means for reducing the bit length of each value of the not-yet-normalized light-source vector; and
        normalized means for normalizing the not-yet-normalized light-source vector using each value having the reduced bit length;
    wherein said bit-length reducing means comprises:
        means for counting the "0" values from the MSB in each value of the not-yet-normalized light-source vector and obtaining the minimum count value;
        means for shifting each value to the MSB side by an amount obtained from subtracting 1 from the minimum value; and
        means for using predetermined more significant bits from the shifted each value so that the bit length of each value of the not-yet normalized light-source vector is reduced.

2. A shading processing device, comprising:
    light-source vector generating means for obtaining a normalized light-source vector of a point light source from light-source coordinates and polygon vertex coordinates;
    diffuse reflection processing means for obtaining a first inner product of the normalized light-source vector calculated by the light-source vector generating means and a polygon normal vector;
    specular reflection processing means for obtaining a light-source reflection vector from the normalized light-source vector and polygon normal vector, and obtaining a second inner product of the light-source reflection vector and a sight-line (eye) vector; and
    color information generating means for calculating polygon surface or polygon vertex color information, which has undergone shading processing, by multiplying said first inner product by diffuse reflection coefficients so as to obtain diffuse reflection light intensities and multiplying said second inner product by specular reflection coefficients so as to obtain specular reflection light intensities,
    wherein said light-source vector generating means comprises:
        means for obtaining a not-yet-normalized light-source vector from the light-source coordinates and the polygon vertex coordinates;
        bit-length reducing means for reducing the bit length of each value of the not-yet-normalized light-source vector; and
        normalized means for normalizing the not-yet-normalized light-source vector using each value having the reduced bit length;
        wherein said color information generating means further obtains a third inner product of the normalized light-source vector and a spotlight vector and the third inner product is used for calculating said polygon surface or polygon vertex color information, which has undergone shading processing.

3. A shading processing device, comprising:
    a light-source vector generating unit which obtains a normalized light-source vector of a point light source from light-source coordinates and polygon vertex coordinates;

a diffuse reflection processing unit which obtains a first inner product of the normalized light-source vector calculated by the light-source vector generating unit and a polygon normal vector;

a specular reflection processing unit which obtains a light-source reflection vector from the normalized light-source vector and polygon normal vector, and obtains a second inner product of the light-source reflection vector and a sight-line (eye) vector; and an RGB generating unit which multiplies said first inner product by R, G, B diffuse reflection coefficients so as to obtain R, G, B diffuse reflection light intensities and multiplies said second inner product by R, G, B specular reflection coefficients so as to obtain R, G, B specular reflection light intensities, wherein said light-source vector generating unit comprises:

a coordinate differential operation unit which obtains a not-yet-normalized light-source vector from the light-source coordinates and the polygon vertex coordinates;

a bit-length reducing unit which reduces the bit length of each value of the not-yet-normalized light-source vector; and a normalizing unit which normalizes the not-yet-normalized light-source vector using each value having the reduced bit length;

wherein said bit-length reducing means comprises:

means for counting the "0" values from the MSB in each value of the not-yet-normalized light-source vector and obtaining the minimum count value;

means for shifting each value to the MSB side by an amount obtained from subtracting 1 from the minimum value; and means for using predetermined more significant bits from the shifted each value so that the bit length of each value of the not-yet-normalized light-source vector is reduced.

4. A shading processing device, comprising:

a light-source vector generating unit which obtains a normalized light-source vector of a point light source from light-source coordinates and polygon vertex coordinates;

a diffuse reflection processing unit which obtains a first inner product of the normalized light-source vector calculated by the light-source vector generating unit and a polygon normal vector;

a specular reflection processing unit which obtains a light-source reflection vector from the normalized light-source vector and polygon normal vector, and obtains a second inner product of the light-source reflection vector and a sight-line (eye) vector; and a luminance value generating unit which multiplies the first inner product by a diffuse reflection coefficient of a luminance value so as to obtain a diffuse reflection light intensity of the luminance value and multiplies the second inner product by a specular reflection coefficient of the luminance value so as to obtain a specular reflection light intensity of the luminance value, wherein said light-source vector generating unit comprises:

a coordinate differential operation unit which obtains a not-yet-normalized light-source vector from the light-source coordinates and the polygon vertex coordinates;

a bit-length reducing unit which reduces the bit length of each value of the not-yet-normalized light-source vector; and a normalizing unit which normalizes the not-yet-normalized light-source vector using each value having the reduced bit length;

wherein said bit-length reducing means comprises:

means for counting the "0" values from the MSB in each value of the not-yet-normalized light-source vector and obtaining the minimum count value;

means for shifting each value to the MSB side by an amount obtained from subtracting 1 from the minimum value; and means for using predetermined more significant bits from the shifted each value so that the bit length of each value of the not-yet-normalized light-source vector is reduced.

5. A shading processing device, comprising:

a light-source vector generating unit which obtains a normalized light-source vector of a point light source from light-source coordinates and polygon vertex coordinates;

a diffuse reflection processing unit which obtains a first inner product of the normalized light-source vector calculated by the light-source vector generating unit and a polygon normal vector;

a specular reflection processing unit which obtains a light-source reflection vector from the normalized light-source vector and polygon normal vector, and obtains a second inner product of the light-source reflection vector and a sight-line (eye) vector; and a luminance value generating unit which multiplies the first inner product by a diffuse reflection coefficient of a luminance value so as to obtain a diffuse reflection light intensity of the luminance value and multiplies the second inner product by a specular reflection coefficient of the luminance value so as to obtain a specular reflection light intensity of the luminance value, wherein said light-source vector generating unit comprises:

a coordinate differential operation unit which obtains a not-yet-normalized light-source vector from the light-source coordinates and the polygon vertex coordinates;

a bit-length reducing unit which reduces the bit length of each value of the not-yet-normalized light-source vector; and a normalizing unit which normalizes the not-yet-normalized light-source vector using each value having the reduced bit length;

wherein said bit-length reducing means comprises:

means for counting the "0" values from the MSB in each value of the the not-yet-normalized light-source vector and obtaining the minimun count value;

means for shifting each value to the MSB side by an amount obtained from subtracting 1 from the minimum value; and means for using predetermined more significant bits from the shifted each value so that the bit length of each value of th not-yet-normalized light vector is reduced.

6. The shading processing device according to claim 2, wherein said color information generating means further uses ambient light intensities for calculating said polygon surface or polygon vertex color information, which has undergone shading processing.

7. A shading processing device, comprising:

a light-source vector generating unit which obtains a normalized light-source vector of a point light source from light-source coordinates and polygon vertex coordinates;

a diffuse reflection processing unit which obtains a first inner product of the normalized light-source vector calculated by the light-source vector generating unit and a polygon normal vector;

a specular reflection processing unit which obtains a light-source reflection vector from the normalized light-source vector and polygon normal vector, and obtains a second inner product of the light-source reflection vector and a sight-line (eye) vector; and a luminance value generating unit which multiplies the first inner product by a diffuse reflection coefficient of a luminance value so as to obtain a diffuse reflection light intensity of the luminance value and multiplies the second inner product by a specular reflection coefficient of the luminance value so as to obtain a specular reflection light intensity of the luminance value, wherein said light-source vector generating unit comprises:

a coordinate differential operation unit which obtains a not-yet-normalized light-source vector from the light-source coordinates and the polygon vertex coordinates;

a bit-length reducing unit which reduces the bit length of each value of the not-yet-normalized light-source vector; and a normalizing unit which normalizes the not-yet-normalized light-source vector using each value having the reduced bit length wherein said color information generating means further obtains a third inner product of the normalized light-source vector and a spotlight vector and the third inner product is used for calculating said polygon surface or polygon vertex color information, which has undergone shading processing.

8. A shading processing device, comprising:

a light-source vector generating unit which obtains a normalized light-source vector of a point light source from light-source coordinates and polygons vertex coordinates;

a diffuse reflection processing unit which obtains a first inner product of the normalized light-source vector calculated by the light-source vector generating unit and a polygon normal vector;

a specular reflection processing unit which obtains a light-source reflection vector from normalized light-source vector and polygon normal vector, and obtains a second inner product of the light-source reflection vector and sight-line (eye) vector; and a luminance value generating unit which multiplies the first inner product by a diffuse reflection coeffeicient of a luminance value so as to obtain a diffuse reflection light intensity of the luminance value and multiplies the second inner product by a specular reflection coefficient of the luminance value so as to obtain a specular reflection light intensity of the luminance value, wherein said light-source vector generating unit comprises:

a coordinate differential operation unit which obtains a not-yet-normalized light-source vector from the light-source coordinates and the polygon vertex coordinates;

a bit-length reducing unit which reduces the bit length of each value of the the not-yet-normalized light-source vector; and a normalizing unit which normalizes the not-yet-normalized light-source vector using each value having the reduced bit length wherein said color information generating means further obtains a third inner product of the normalized light-source vector and a spotlight vector and the third product is used for calculating said polygon surface or polygon vertex color information, which has undergone shading processing.

* * * * *